(12) United States Patent
Matsuhana et al.

(10) Patent No.: US 10,398,012 B2
(45) Date of Patent: Aug. 27, 2019

(54) X-RAY INSPECTION SYSTEM

(71) Applicant: Shimadzu Corporation, Kyoto (JP)

(72) Inventors: Bunta Matsuhana, Kyoto (JP); Futoshi Ueki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 243 days.

(21) Appl. No.: 15/685,703

(22) Filed: Aug. 24, 2017

(65) Prior Publication Data
US 2018/0110115 A1 Apr. 19, 2018

(30) Foreign Application Priority Data
Oct. 17, 2016 (JP) ................................ 2016-203719

(51) Int. Cl.
| | |
|---|---|
| *H05G 1/54* | (2006.01) |
| *G01T 1/00* | (2006.01) |
| *H05G 1/08* | (2006.01) |
| *H05G 1/30* | (2006.01) |
| *H05G 1/02* | (2006.01) |

(52) U.S. Cl.
CPC ................ *H05G 1/54* (2013.01); *G01T 1/00* (2013.01); *H05G 1/02* (2013.01); *H05G 1/085* (2013.01); *H05G 1/30* (2013.01); *H01J 2235/085* (2013.01)

(58) Field of Classification Search
CPC ....... G01T 1/00; H01J 2235/085; H05G 1/02; H05G 1/085; H05G 1/30; H05G 1/54
See application file for complete search history.

(56) References Cited

U.S. PATENT DOCUMENTS

| | | | | |
|---|---|---|---|---|
| 5,517,545 A | * | 5/1996 | Nakamura | H05G 1/06 378/101 |
| 2007/0195927 A1 | * | 8/2007 | Fung | G01N 23/043 378/58 |
| 2010/0329532 A1 | * | 12/2010 | Masuda | G01N 23/046 382/132 |
| 2016/0363544 A1 | * | 12/2016 | Tagawa | G01N 23/046 |

FOREIGN PATENT DOCUMENTS

| | | |
|---|---|---|
| JP | 2000-30890 A | 1/2000 |
| JP | 2009-266688 A | 11/2009 |
| JP | 2015-150054 A | 8/2015 |

* cited by examiner

*Primary Examiner* — Marcus H Taningco
(74) *Attorney, Agent, or Firm* — Maier & Maier, PLLC

(57) ABSTRACT

An X-ray inspection system that can simply and automatically perform aging without separately preparing a shutter moving member including a dedicated motor or a guide member for aging is provided. When power is supplied, a stage moves in X and Y directions by activating a stage moving mechanism, and an X-ray source stops at an aging position below an X-ray shielding plate disposed beside a support plate on the stage. In this state, aging is started. When the aging is ended, an input of an imaging instruction for X-ray imaging is waited for.

3 Claims, 5 Drawing Sheets

X-RAY INSPECTION SYSTEM

BACKGROUND OF THE INVENTION

Field of the Invention

The present invention relates to an X-ray inspection system that nondestructively inspects an internal structure of an inspection object with a three-dimensional shape.

Description of the Related Art

An X-ray inspection system includes an X-ray imaging system including an X-ray source that irradiates an inspection object with X-rays and an X-ray detector such as a flat panel detector or an image intensifier (I.I.) that detects the X-rays emitted from the X-ray source and passing through the inspection object, a stage that is disposed between the X-ray source and the X-ray detector, the inspection object being mounted on a top surface of the stage, and a moving mechanism that relatively moves the stage and the X-ray imaging system. In such an X-ray inspection system, in order to acquire an X-ray image in which an inspection object is magnified, generally, the X-ray source and the inspection object are disposed close to each other and the inspection object and the X-ray detector are disposed separate from each other.

The X-ray source which is used for the X-ray inspection system includes a filament (a negative electrode) and a target (a positive electrode) to which a high voltage is applied and generates X-rays by causing thermoelectrons emitted from the filament to collide with the target. When the X-ray source is used at the first time or when the X-ray source is repeated to use after an unused state is maintained, foreign materials such as protrusions of a high-voltage applied portion having the same potential as the target serving as a cause for electric field concentration are melted to form a smooth equipotential surface and to improve high withstanding voltage characteristics by applying a low tube voltage and then gradually increasing the tube voltage. An operation called aging is required (see JP-A-2009-266688).

When such aging is performed, a relatively large dose of X-rays from the X-ray source are incident on the X-ray detector for a long time and thus a problem with a decrease in sensitivity of the X-ray detector and shortening of a lifespan of the X-ray detector is caused. Accordingly, a measure that an operator covers an X-ray emission portion of the X-ray source with a cover formed of a material having a low X-ray transmission factor such as lead before performing the aging has been taken in the related art. A configuration in which a shutter formed of a material having a low X-ray transmission factor such as lead is automatically moved to the X-ray emission portion of the X-ray source before an aging operation is started has been proposed.

In the field of a medical X-ray imaging device other than the X-ray inspection system, a configuration in which emission of X-rays to the outside is restricted by completely covering a collimator that limits an X-ray irradiation field at the time of aging (see JP-A-2000-30890) or a configuration in which X-rays emitted from an X-ray source is prevented from being incident on an X-ray detector by disposing the X-ray source and the X-ray detector at positions at which both do not face each other at the time of aging (see JP-A-2015-150054) is disclosed.

As described above, when the configuration in which an operator covers the X-ray emission portion of the X-ray source with the cover formed of a material having a low X-ray transmission factor such as lead before performing aging is employed, it is necessary to perform an operation of operating the cover at the time of performing aging. Accordingly, the operation is troublesome and there is a likelihood that the operation will be forgotten. There is also a likelihood that opening of the cover will be forgotten at the time of next inspection.

On the other hand, when the configuration in which a shutter formed of a material having a low X-ray transmission factor is automatically moved to the X-ray emission portion of the X-ray source at the time of starting an aging operation is employed, a shutter moving member such as a dedicated motor or a guide member needs to be provided to move the shutter. Accordingly, there is a problem in that a system configuration for performing the aging is complicated and a system cost increases.

SUMMARY OF THE INVENTION

The invention is made to solve the above-mentioned problem and an object thereof is to provide an X-ray inspection system that can simply and automatically perform aging without separately providing a dedicated shutter moving member for aging.

According to a first aspect of the invention, there is provided an X-ray inspection system including: an X-ray imaging system including an X-ray source that irradiates an inspection object with X-rays and an X-ray detector that detects the X-rays emitted from the X-ray source and passing through the inspection object; a stage that is disposed between the X-ray source and the X-ray detector, the inspection object being mounted on the stage; a moving mechanism that relatively moves the stage and the X-ray imaging system; an X-ray shielding member that is disposed beside a mounting area of the inspection object on the stage; and a control unit that moves the X-ray imaging system relatively to the stage to an aging position at which the X-ray source and the X-ray shielding member face each other by controlling the moving mechanism when aging is performed on the X-ray source.

A second aspect of the invention provides the X-ray inspection system according to the first aspect, in which the control unit moves the X-ray imaging system to the aging position at the time of start of inspection or at the time of end of inspection.

A third aspect of the invention provides the X-ray inspection system according to the first aspect, in which the control unit moves the X-ray imaging system to the aging position when an operation of instructing start of aging is performed.

According to the first aspect, by disposing the X-ray shielding member beside the mounting area of an inspection object on the stage, it is possible to simply and automatically perform aging without separately preparing a dedicated shutter moving member for aging.

According to the second aspect, it is possible to perform aging at the time of start of inspection or at the time of end of inspection.

According to the third aspect, it is possible to perform aging in response to an operator's operation.

DETAILED DESCRIPTION OF THE INVENTION

Figure 1:
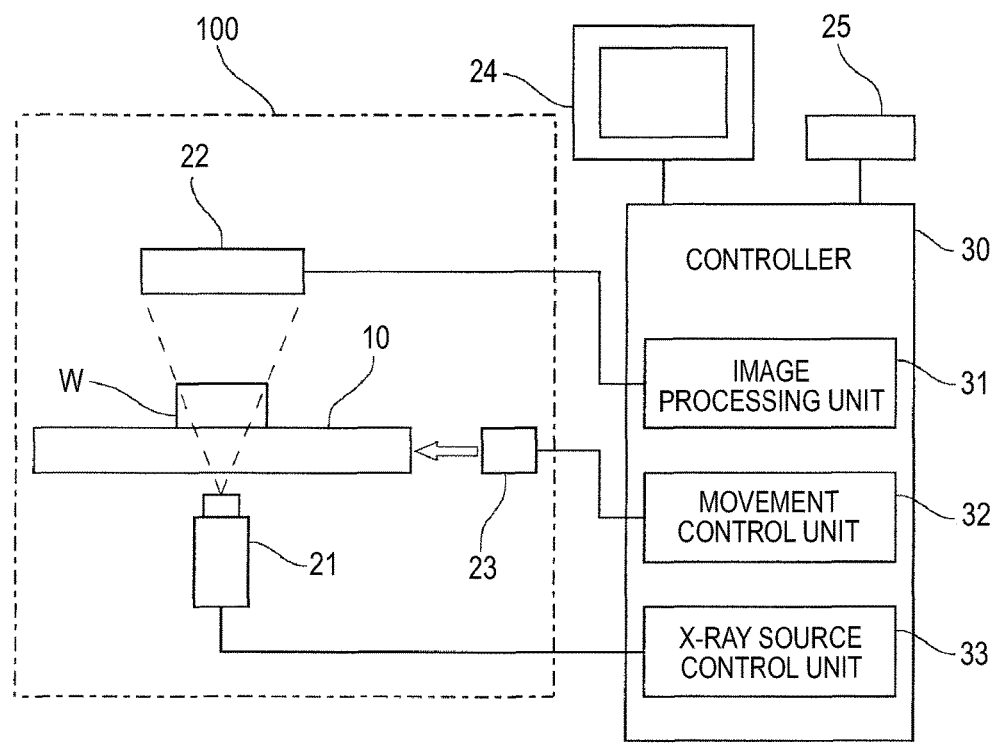
FIG. 1 is a diagram schematically illustrating an X-ray inspection system according to the invention along with a principal control system.
Figure 2:
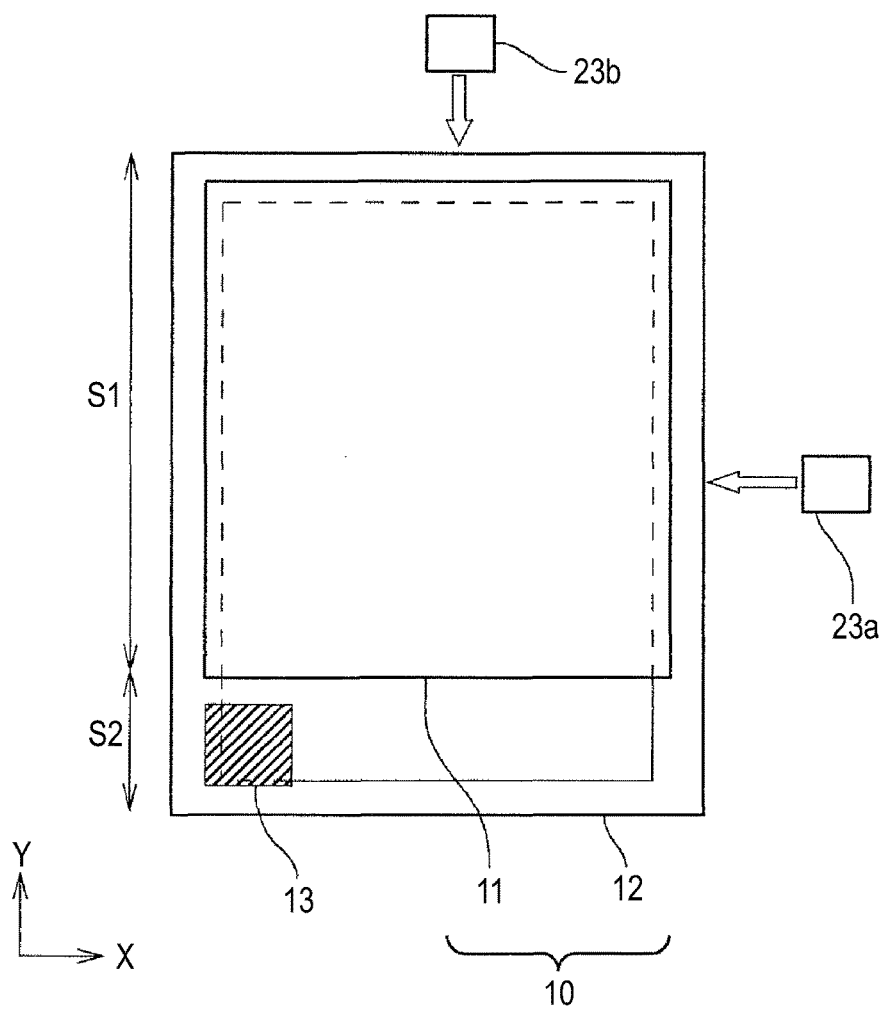
FIG. 2 is a plan view illustrating a configuration in the vicinity of a stage of the X-ray inspection system according to the invention.

FIG. 1 is a diagram schematically illustrating an X-ray inspection system according to the invention along with a principal control system. FIG. 2 is a plan view illustrating a configuration in the vicinity of a stage 10 of the X-ray inspection system according to the invention.

The X-ray inspection system according to the invention includes an X-ray source 21 that irradiates a workpiece W as an inspection object with X-rays, an X-ray detector 22 such as a flat panel detector or an image intensifier (I.I.) that detects the X-rays emitted from the X-ray source 21 and then passing through the workpiece W, and a stage 10 that is disposed between the X-ray source 21 and the X-ray detector 22 and on which the workpiece W is mounted. The X-ray source 21 and the X-ray detector 22 constitute an X-ray imaging system according to the invention.

The stage 10 includes a frame 12 formed of metal and an X-tray transmitting support plate 11 that is supported by the frame 12. The support plate 11 serves as a mounting area on which the workpiece W is mounted at the time of X-ray inspection and is formed of a carbon plate transmitting X-ray well. An X-ray shielding plate 13 is disposed beside the support plate 11 in a state in which it is supported by the frame 12. The X-ray shielding plate 13 is formed of a lead plate that blocks X-rays at a high ratio. Instead of the lead plate, an iron plate having a predetermined thickness may be used as the X-ray shielding plate 13.

The stage 10 is movable in a horizontal direction (an XY direction illustrated in FIG. 2) by activating stage moving mechanisms 23a and 23b (which are generically referred to as a "stage moving mechanism 23" including a motor which is not illustrated). The X-ray source 21, the X-ray detector 22, the stage 10, and the stage moving mechanism 23 are disposed in a casing 100 formed of an X-ray shielding member.

The X-ray inspection system according to the invention includes a CPU that performs a logical operation as a processor, a ROM in which operation programs required for controlling the system are stored, a RAM in which data or the like is temporarily stored at the time of control, and a control unit 30 that controls the entire system. The control unit 30 is connected to a display unit 24 such as a liquid crystal display panel that displays an X-ray image and the like detected by the X-ray detector 22 and an operation unit 25 that includes a mouse, a keyboard, or and the like for performing various operations.

The control unit 30 includes an image processing unit 31 that processes an X-ray image detected by the X-ray detector 22 and displays the processed X-ray image on the display unit 24, a movement control unit 32 that controls the stage moving mechanism 23, and an X-ray source control unit 33 that controls lighting of the X-ray source 21.

As illustrated in FIG. 2, the stage 10 reciprocates in the X direction by activation of the stage moving mechanism 23a and reciprocates in the Y direction by activation of the stage moving mechanism 23b. Accordingly, the X-ray imaging system including the X-ray source 21 and the X-ray detector 22 which are disposed to face each other and the stage 10 are relatively moved in the X and Y directions. A moving stroke in the Y direction of the stage 10 is S1 illustrated in FIG. 2 at the time of normal X-ray imaging and is an inspection area in which the workpiece W is mounted on a central portion of the support plate 11 illustrated in FIG. 2 and is subjected to X-ray inspection. At the time of aging which will be described later, the moving stroke in the Y direction of the stage 10 is S2 illustrated in FIG. 2 to correspond to the X-ray shielding plate 13. Accordingly, the stage 10 can move in a range of S1+S2 in the Y direction illustrated in FIG. 2.

Figure 3A:
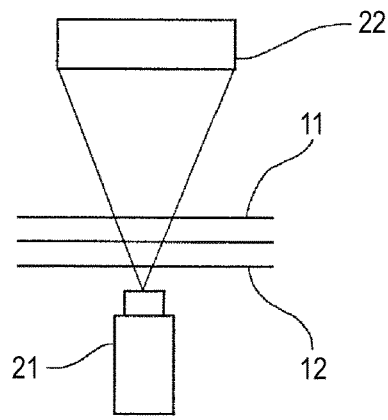
FIGS. 3A and 3B are schematic lateral views illustrating an arrangement relationship between an X-ray source, an X-ray detector, and a stage.
Figure 3B:
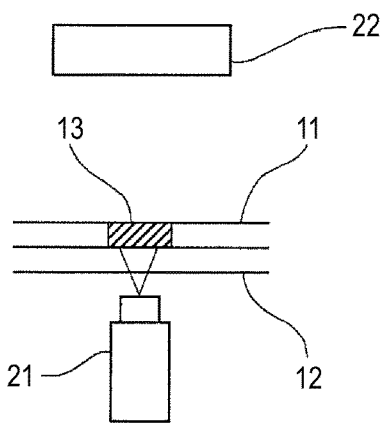

FIGS. 3A and 3B are schematic lateral views illustrating an arrangement relationship between the X-ray source 21, the X-ray detector 22, and the stage 10.

When the X-ray imaging system including the X-ray source 21 and the X-ray detector 22 is disposed to face the support plate 11, X-rays emitted from the X-ray source 21 pass through the support plate 11 and reaches the X-ray detector 22 as illustrated in FIG. 3A. On the other hand, the X-ray imaging system including the X-ray source 21 and the X-ray detector 22 is disposed to face the X-ray shielding plate 13, X-rays emitted from the X-ray source 21 are blocked by the X-ray shielding plate 13 and do not reach the X-ray detector 22.

When X-ray inspection is performed in the X-ray inspection system having the above-mentioned configuration, the workpiece W is mounted on the support plate 11 of the stage 10. Then, under the control of the movement control unit 32, the stage 10 is moved in the X and Y directions and the X-ray imaging system including the X-ray source 21 and the X-ray detector 22 is disposed at a position above and below the workpiece W. In this state, under the control of the X-ray source control unit 33, the workpiece W is irradiated with X-rays from the X-ray source 21 as illustrated in FIG. 3A. An X-ray transmission image is detected by the X-ray detector 22, is processed by the image processing unit 31, and is then displayed on the display unit 24.

Figure 4:
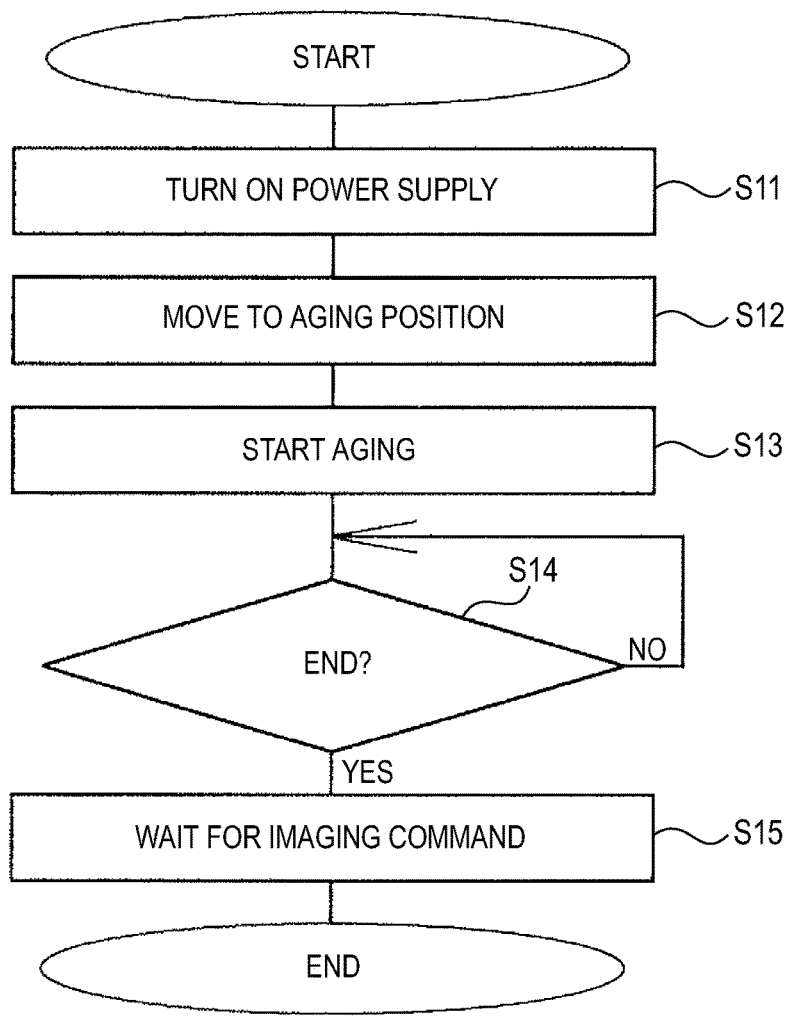
FIG. 4 is a flowchart illustrating a first embodiment of an aging operation which is performed by the X-ray inspection system according to the invention.

On the other hand, in the X-ray inspection system, aging is performed when the system is reused after a state in which the system is not used is maintained for a predetermined period. Hereinafter, the aging operation will be described. FIG. 4 is a flowchart illustrating a first embodiment of the aging operation which is performed by the X-ray inspection system according to the invention. The aging operation according to the first embodiment is for automatically performing aging at the time of start of use of the system.

That is, first, power is supplied (Step S11). In response thereto, the stage 10 moves in the X and Y directions by activation of the stage moving mechanism 23 under the control of the movement control unit 32 of the control unit 30, and the X-ray source 21 stops at an aging position below the X-ray shielding plate 13 added to the stage 10 as illustrated in FIG. 3(b) (Step S12).

In this state, foreign materials such as protrusions of a high-voltage applied portion in the X-ray source 21 are melted to start aging of forming a smooth equipotential surface and improving high withstanding voltage characteristics by applying a low tube voltage to the X-ray source 21 and then gradually increasing the tube voltage (Step S13). When about fifteen minutes to two hours elapses in this state, the aging ends (Step S14). When the aging ends, an input of an imaging instruction for X-ray imaging from the operation unit 25 is waited for (Step S15).

According to the aging operation according to the first embodiment, aging can be automatically performed before X-ray imaging is started. Instead of automatically performing the aging before X-ray imaging is started, when X-ray imaging ends, the stage 10 may be automatically moved to the aging position, the aging may be performed, and then supply of power may be cut off.

Figure 5:
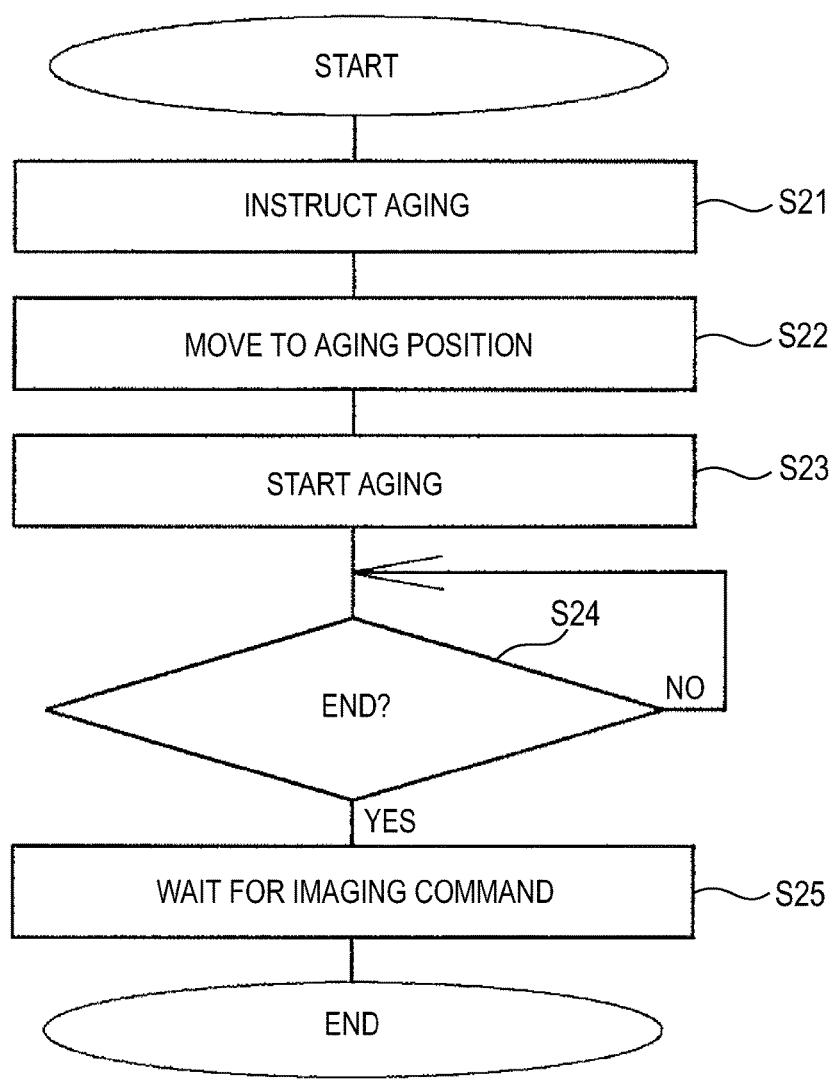
FIG. 5 is a flowchart illustrating a second embodiment of the aging operation which is performed by the X-ray inspection system according to the invention.

FIG. 5 is a flowchart illustrating a second embodiment of the aging operation which is performed by the X-ray inspection system according to the invention. The aging operation according to the second embodiment is for performing aging in response to an operator's instruction.

In the aging operation according to the second embodiment, an operator instructs aging by operating the operation unit 25 (Step S21). Accordingly, the stage 10 moves in the X and Y directions by activation of the stage moving mechanism 23 under the control of the movement control unit 32 of the control unit 30, and the X-ray source 21 stops at an aging position below the X-ray shielding plate 13 added to the stage 10 as illustrated in FIG. 3(*b*) (Step S22). In this state, the aging is started (Step S23). When about fifteen minutes to two hours elapses in this state, the aging ends (Step S24). When the aging ends, an input of an imaging instruction for X-ray imaging from the operation unit 25 is waited for (Step S25).

In the above-mentioned embodiment, a configuration in which the stage 10 is moved relative to the X-ray imaging system including the X-ray source 21 and the X-ray detector 22 which are disposed to face each other is employed, but a configuration in which the stage 10 is fixed and the X-ray imaging system including the X-ray source 21 and the X-ray detector 22 is moved may be employed.

In the above-mentioned embodiment, all the X-rays emitted from the X-ray source 21 are blocked by the X-ray shielding plate 13, but the X-ray shielding plate 13 has only to prevent at least the X-ray detector 22 from being irradiated with X-rays.

What is claimed is:

1. An X-ray inspection system comprising:
    an X-ray imaging system including an X-ray source that irradiates an inspection object with X-rays and an X-ray detector that detects the X-rays emitted from the X-ray source and passing through the inspection object;
    a stage that is disposed between the X-ray source and the X-ray detector, the inspection object being mounted on the stage;
    a moving mechanism that relatively moves the stage and the X-ray imaging system;
    an X-ray shielding member that is disposed beside a mounting area of the inspection object on the stage; and
    a control unit that moves the X-ray imaging system relatively to the stage to an aging position at which the X-ray source and the X-ray shielding member face each other by controlling the moving mechanism when aging is performed on the X-ray source.

2. The X-ray inspection system according to claim 1, wherein the control unit moves the X-ray imaging system to the aging position at the time of start of inspection or at the time of end of inspection.

3. The X-ray inspection system according to claim 1, wherein the control unit moves the X-ray imaging system to the aging position when an operation of instructing start of aging is performed.

\* \* \* \* \*